US009800766B2

United States Patent
Tsuji

(10) Patent No.: US 9,800,766 B2
(45) Date of Patent: Oct. 24, 2017

(54) COLORIMETRIC VALUE ACQUISITION METHOD, IMAGE FORMING DEVICE, AND COLORIMETRIC VALUE ACQUISITION CONTROL PROGRAM

(71) Applicant: Konica Minolta, Inc., Chiyoda-ku, Tokyo (JP)

(72) Inventor: Kosuke Tsuji, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/341,689

(22) Filed: Nov. 2, 2016

(65) Prior Publication Data

US 2017/0134618 A1    May 11, 2017

(30) Foreign Application Priority Data

Nov. 5, 2015 (JP) ................................. 2015-217381

(51) Int. Cl.
*H04N 1/40* (2006.01)
*H04N 1/00* (2006.01)
(Continued)

(52) U.S. Cl.
CPC ....... *H04N 1/6086* (2013.01); *H04N 1/00023* (2013.01); *H04N 1/00034* (2013.01);
(Continued)

(58) Field of Classification Search
CPC ............. H04N 1/6086; H04N 1/00023; H04N 1/00034; H04N 1/00045; H04N 1/00063;
(Continued)

(56) References Cited

U.S. PATENT DOCUMENTS

2012/0044540 A1\* 2/2012 Dalal .................. H04N 1/6033
358/1.18
2013/0235430 A1\* 9/2013 Sakatani .............. G06K 15/129
358/3.23

FOREIGN PATENT DOCUMENTS

JP    2003-283773 A    10/2003
JP    2007-170883 A    7/2007

OTHER PUBLICATIONS

The Extended European Search Report dated Mar. 31, 2017, by the European Patent Office in corresponding European Patent Application No. 16194489.7-1902. (7 pages).

\* cited by examiner

*Primary Examiner* — Quang N Vo
(74) *Attorney, Agent, or Firm* — Buchanan Ingersoll & Rooney PC

(57) ABSTRACT

A colorimetric value acquisition method in a system including a printing unit, a scanner, and a colorimetric unit, wherein the system executes: first processing to cause the printing unit to print a first chart, to cause the scanner to measure all the patches to acquire RGB values, to cause the colorimetric unit to measure all the patches to acquire colorimetric values, and to create a scanner profile; second processing to cause the printing unit to print a second chart, to cause the scanner to measure all the patches to acquire RGB values, and to cause the colorimetric unit to measure a part of the patches; third processing to specify an RGB value; fourth processing to calculate a difference between the RGB value and an RGB value; fifth processing to calculate a corrected RGB value; and sixth processing to acquire an estimated colorimetric value and output the estimated colorimetric value.

12 Claims, 12 Drawing Sheets

(51) Int. Cl.
  *H04N 1/60* (2006.01)
  *H04N 1/64* (2006.01)
  *G06K 15/00* (2006.01)
(52) U.S. Cl.
  CPC ..... *H04N 1/00045* (2013.01); *H04N 1/00063* (2013.01); *H04N 1/6008* (2013.01); *H04N 1/6044* (2013.01); *H04N 1/646* (2013.01); *H04N 2201/0094* (2013.01)
(58) Field of Classification Search
  CPC .... H04N 1/6008; H04N 1/6044; H04N 1/646; H04N 2201/0094
  See application file for complete search history.

CHART FOR CREATING SCANNER PROFILE (AFTER PATCHES ARE REARRANGED)

50

40

CHART FOR CREATING PRINTER PROFILE (BEFORE PATCHES ARE REARRANGED)

51

CHART FOR CREATING PRINTER PROFILE (AFTER PATCHES ARE REARRANGED)

51

COLORIMETRIC VALUE ACQUISITION METHOD, IMAGE FORMING DEVICE, AND COLORIMETRIC VALUE ACQUISITION CONTROL PROGRAM

The entire disclosure of Japanese Patent Application No. 2015-217381 filed on Nov. 5, 2015 including description, claims, drawings, and abstract are incorporated herein by reference in its entirety.

BACKGROUND OF THE INVENTION

Field of the Invention

The present invention relates to a colorimetric value acquisition method, an image forming device, and a colorimetric value acquisition control program, and particularly relates to a colorimetric value acquisition method, an image forming device, and a colorimetric value acquisition control program for acquiring a colorimetric value to correct a flare level of a chart simply and properly.

Description of the Related Art

In a device such as a scanner or a printer, a device value (an RGB value or a CMYK value) output from the device depends on the device, and therefore a color conversion table (device profile) to convert this device value into a color not depending on the device is created, and color conversion is performed using the device profile.

Regarding creation of such a device profile, for example, when a scanner profile is created, the scanner profile can be created by measuring a chart for creating a scanner profile output from a printer with a scanner and a colorimetric apparatus and correlating an RGB value measured with the scanner with a colorimetric value such as an L*a*b* value of a CIE 1976 color space or an XYZ value of a CIE 1931 color space measured with the colorimetric apparatus. When a printer profile is created, the printer profile can be created by measuring a chart for creating a printer profile with a scanner and acquiring a colorimetric value from an RGB value measured with the scanner using the scanner profile.

When an RGB value is acquired using the chart for creating a scanner profile or the chart for creating a printer profile, it is necessary to detect only reflected light from a patch to be measured. However, actually, in addition to the reflected light from the patch to be measured, an output including reflected light from a surrounding patch is acquired due to irregular reflection. Such a phenomenon that reflected light more than an original output is measured due to irregular reflection between a measurement object and a light source is referred to as a flare. When an RGB value is acquired, it is necessary to correct an influence by the flare.

Regarding a technology for correcting this influence by a flare, for example, JP 2003-283773 A discloses a flare correction data measuring method using an irradiation unit for irradiating a reading surface of a document placed on a document placement surface with light, an imaging unit for imaging the reading surface with light with which the reading surface of the document is irradiated, and an image reading device for forming image signal data from a signal output from the imaging unit. In the flare correction data measuring method, a point light source is disposed on a measurement document a reading surface of which is formed of a diffusion reflected surface, light reflected by the entire reading surface is imaged by light emitted by the point light source, image signal intensity distribution data divided into image regions including light emitting image regions of the point light source as basic units is generated from a signal output from the imaging unit, and flare correction data is calculated from the generated image signal intensity distribution data and illuminance distribution data of the reading surface detected by causing the irradiation unit to emit light in advance.

The chart for creating a scanner profile and the chart for creating a printer profile are different from each other in a structure of a patch, and therefore are different from each other in the degree of an influence by a flare (referred to as flare level). Therefore, in order to utilize a scanner profile created using the chart for creating a scanner profile, it is necessary to correct a flare level of the chart for creating a printer profile (match the flare level of the chart for creating a printer profile with that of the chart for creating a scanner profile).

As a method for correcting this flare level, a method for calculating flare correction data in advance as described in JP 2003-283773 A is considered. However, this method cannot correspond to charts having various patch structures. That is, in order to correspond not only to a fixed chart but also to various charts, it is necessary to correct a flare level dynamically. On the other hand, a method for creating a printer profile by measuring all patches of a chart for creating a printer profile with a colorimetric apparatus without using flare correction data is also considered. However, it takes time to acquire a colorimetric value with the colorimetric apparatus, and many charts have to be output in order to acquire a colorimetric value. Therefore, waste paper is increased disadvantageously.

SUMMARY OF THE INVENTION

The present invention has been achieved in view of the above problems, and a main object thereof is to provide a colorimetric value acquisition method, an image forming device, and a colorimetric value acquisition control program capable of acquiring a colorimetric value to correct a flare level of a chart simply and properly.

To achieve the abovementioned object, according to an aspect, there is provided a colorimetric value acquisition method, reflecting one aspect of the present invention, in a system including a printing unit, a scanner configured to acquire an RGB value by measuring an image formed by the printing unit, and a colorimetric unit configured to acquire a colorimetric value formed of an L*a*b* value or an XYZ value by measuring an image formed by the printing unit, wherein the system executes: first processing configured to cause the printing unit to print a first chart in which patches are rearranged in advance such that a flare level is uniform, to cause the scanner to measure all the patches of the first chart to acquire RGB values, to cause the colorimetric unit to measure all the patches to acquire colorimetric values, and to create a scanner profile by correlating the RGB values with the colorimetric values; second processing configured to cause the printing unit to print a second chart in which patches are rearranged in advance such that a flare level is uniform, to cause the scanner to measure all the patches of the second chart to acquire RGB values, and to cause the colorimetric unit to measure a part of the patches to acquire colorimetric values; third processing configured to specify an RGB value corresponding to each of the colorimetric values acquired in the second processing using the scanner profile; fourth processing configured to calculate a difference between the RGB value specified in the third processing and an RGB value of each of the part of the patches acquired in the second processing; fifth processing configured to calculate a corrected RGB value by applying the difference to an RGB value of each of the patches acquired in the second processing; and sixth processing configured to acquire an estimated colorimetric value corresponding to the corrected RGB value using the scanner profile, and to output the estimated colorimetric value for color management of the system.

To achieve the abovementioned object, according to an aspect, an image forming device provided with a printing unit, an in-line scanner configured to acquire an RGB value by measuring an image formed by the printing unit, and an in-line colorimetric unit configured to acquire a colorimetric value formed of an L*a*b* value or an XYZ value by measuring an image formed by the printing unit, reflecting one aspect of the present invention comprises: a profile creating unit configured to cause the printing unit to print a first chart in which patches are rearranged in advance such that a flare level is uniform, to cause the in-line scanner to measure all the patches of the first chart to acquire RGB values, to cause the in-line colorimetric unit to measure all the patches to acquire colorimetric values, and to create a scanner profile by correlating the RGB values with the colorimetric values; a correction amount calculating unit configured to cause the printing unit to print a second chart in which patches are rearranged in advance such that a flare level is uniform, to cause the in-line scanner to measure all the patches of the second chart to acquire RGB values, to cause the in-line colorimetric unit to measure a part of the patches to acquire colorimetric values, to specify an RGB value corresponding to each of the acquired colorimetric values using the scanner profile, and to calculate a difference between the RGB value specified using the scanner profile and an RGB value of each of the part of the patches acquired by measurement with the in-line scanner; and a colorimetric value estimating unit configured to calculate a corrected RGB value by applying the difference to an RGB value of each of the patches acquired by measurement with the in-line scanner, to acquire an estimated colorimetric value corresponding to the corrected RGB value using the scanner profile, and to output the estimated colorimetric value for color management of the image forming device.

To achieve the abovementioned object, according to an aspect, there is provided a non-transitory recording medium storing a computer readable program configured to control acquisition of a colorimetric value, operated by a system including an image forming device provided with a printing unit, an in-line scanner configured to acquire an RGB value by measuring an image formed by the printing unit, and an in-line colorimetric unit configured to acquire a colorimetric value formed of an L*a*b* value or an XYZ value by measuring an image formed by the printing unit, wherein the program reflecting one aspect of the present invention causes a control device in the system to execute: first processing configured to cause the printing unit to print a first chart in which patches are rearranged in advance such that a flare level is uniform, to cause the in-line scanner to measure all the patches of the first chart to acquire RGB values, to cause the in-line colorimetric unit to measure all the patches to acquire colorimetric values, and to create a scanner profile by correlating the RGB values with the colorimetric values; second processing configured to cause the printing unit to print a second chart in which patches are rearranged in advance such that a flare level is uniform, to cause the in-line scanner to measure all the patches of the second chart to acquire RGB values, and to cause the in-line colorimetric unit to measure a part of the patches to acquire colorimetric values; third processing configured to specify an RGB value corresponding to each of the colorimetric values acquired in the second processing using the scanner profile; fourth processing configured to calculate a difference between the RGB value specified in the third processing and an RGB value of each of the part of the patches acquired in the second processing; fifth processing configured to calculate a corrected RGB value by applying the difference to an RGB value of each of the patches acquired in the second processing; and sixth processing configured to acquire an estimated colorimetric value corresponding to the corrected RGB value using the scanner profile, and to output the estimated colorimetric value for color management of the image forming device.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
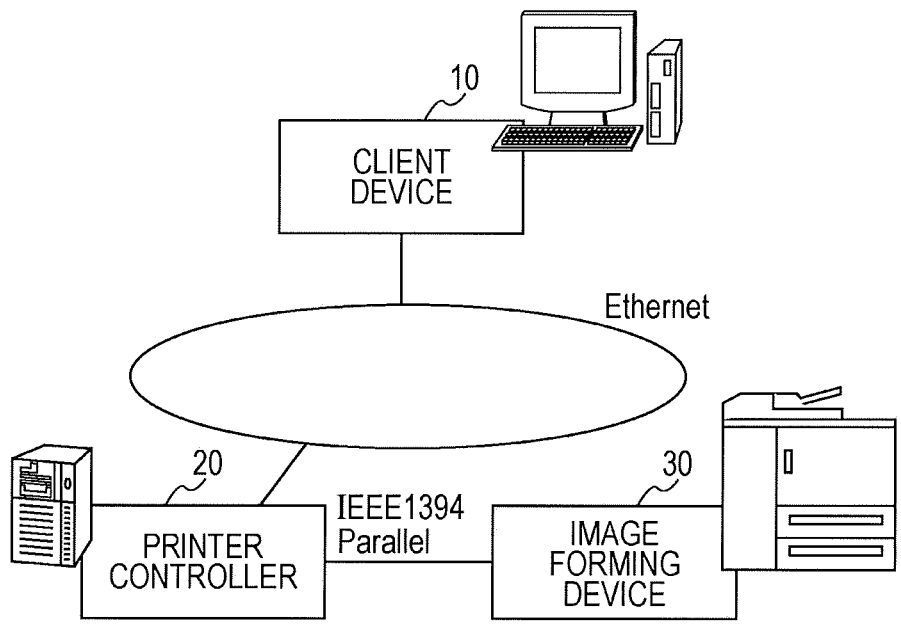
FIG. 1 is a schematic diagram illustrating a structure of a printing system according to an Example of the present invention.

Hereinafter, an embodiment of the present invention will be described with reference to the drawings. However, the scope of the invention is not limited to the illustrated examples.

An image forming device performs color correction or color accuracy verification by printing a chart and subjecting the printed chart to colorimetry. When an RGB value of a patch of a chart is acquired, it is necessary to detect only reflected light from a patch to be measured. However, actually, in addition to the reflected light from the patch to be measured, irregularly reflected light from a surrounding patch is also detected due to irregular reflection, resulting in an output influenced by a flare. With respect to this problem, JP 2003-283773 A has proposed a method for calculating flare correction data in advance. However, there are various kinds of charts (patch structures), and it is unrealistic to calculate flare correction data corresponding to all the kinds of charts. On the other hand, a method for measuring all patches of a chart with a colorimetric apparatus without using flare correction data is also considered. However, in this method, colorimetry with the colorimetric apparatus takes time, and waste paper is increased disadvantageously due to output of many charts. Particularly when a scanner or a colorimetric apparatus is disposed in an image forming device (referred to as an in-line scanner/in-line colorimetric apparatus) in order to subject a printed chart to colorimetry at real time, much time for colorimetry with the in-line colorimetric apparatus makes processing of a printing job slow.

Therefore, in an embodiment of the present invention, under a condition that each of a chart for creating a scanner profile and a chart utilizing a scanner profile (a chart for creating a printer profile or the like) has a uniform flare level in each of the charts, first, all patches of the chart for creating a scanner profile are measured with a scanner to acquire RGB values. All the patches are measured with a colorimetric apparatus to acquire colorimetric values (L*a*b* values or XYZ values). A scanner profile is created by correlating each of the RGB value with each of the colorimetric values. Then, all patches of the chart for creating a printer profile are measured with a scanner to acquire RGB values. A part of the patches is measured with a colorimetric apparatus to acquire colorimetric values. A difference between each of the colorimetric values and an RGB value acquired by specifying an RGB value corresponding to each of the colorimetric values of the part of the patches (RGB value correction amount) is calculated. By applying the RGB value correction amount to the acquired RGB value of each of the patches of the chart for creating a printer profile, a flare level of the chart for creating a scanner profile is matched with that of the chart for creating a printer profile.

A flare has an influence on an acquired RGB value of a patch. Therefore, correction of the RGB value has the same meaning as correction of the flare level, and this RGB value correction amount is a flare level correction amount. In this case, in the present embodiment, in each of the chart for creating a scanner profile and the chart for creating a printer profile, the patches are rearranged such that a flare level is uniform in the chart by applying a technology of an earlier application by the present inventors. Therefore, it is possible to apply a flare level correction amount calculated for a part of the patches of the chart for creating a printer profile to all the patches. Therefore, it is only required to acquire colorimetric values for a part of the patches (at least one patch) of the chart for creating a printer profile, and the number of the patches measured with a colorimetric apparatus can be minimized. Therefore, time for measuring the chart with a colorimetric apparatus or waste paper can be reduced.

EXAMPLES

Figure 2:
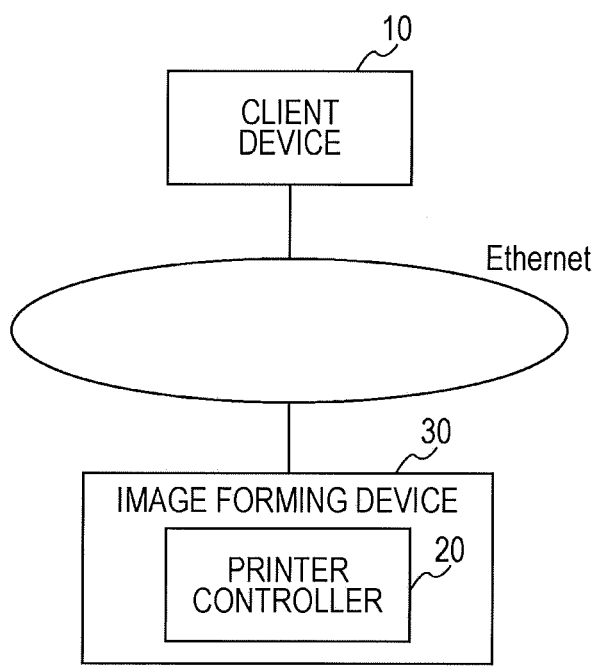
FIG. 2 is a schematic diagram illustrating another structure of the printing system according to the Example of the present invention.
Figure 3A:
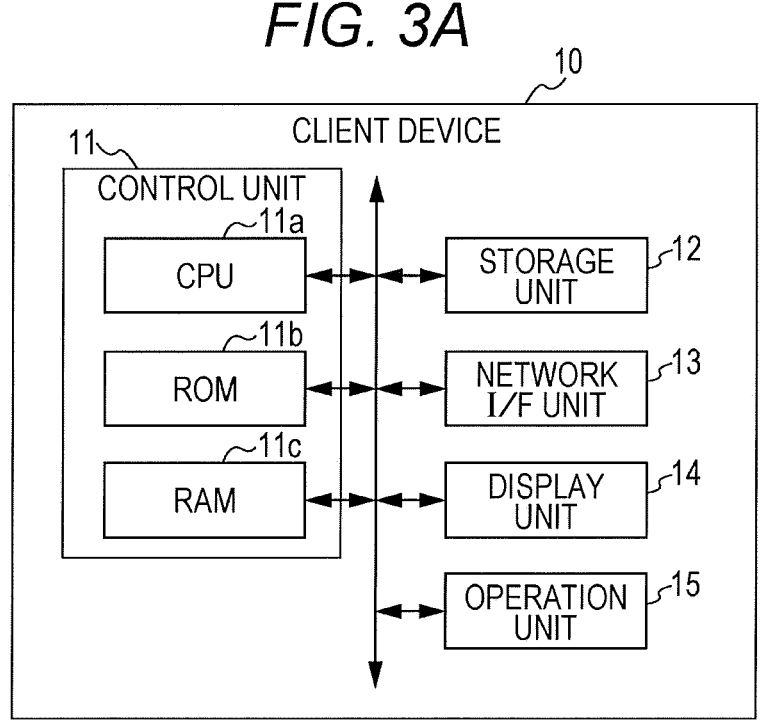
FIGS. 3A and 3B are block diagrams illustrating a structure of a client device according to the Example of the present invention.
Figure 3B:
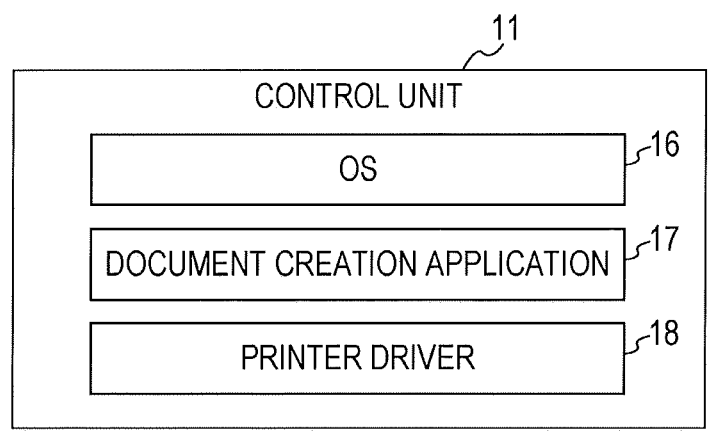
Figure 4A:
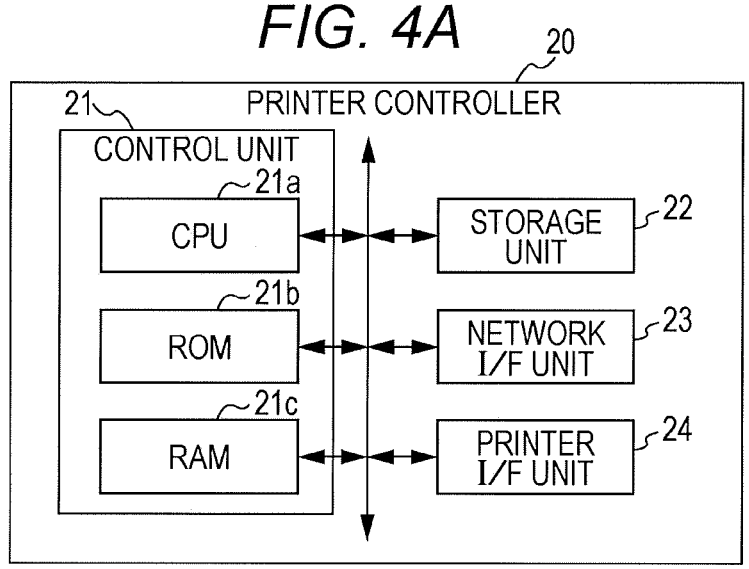
FIGS. 4A and 4B are block diagrams illustrating a structure of a printer controller according to the Example of the present invention.
Figure 4B:
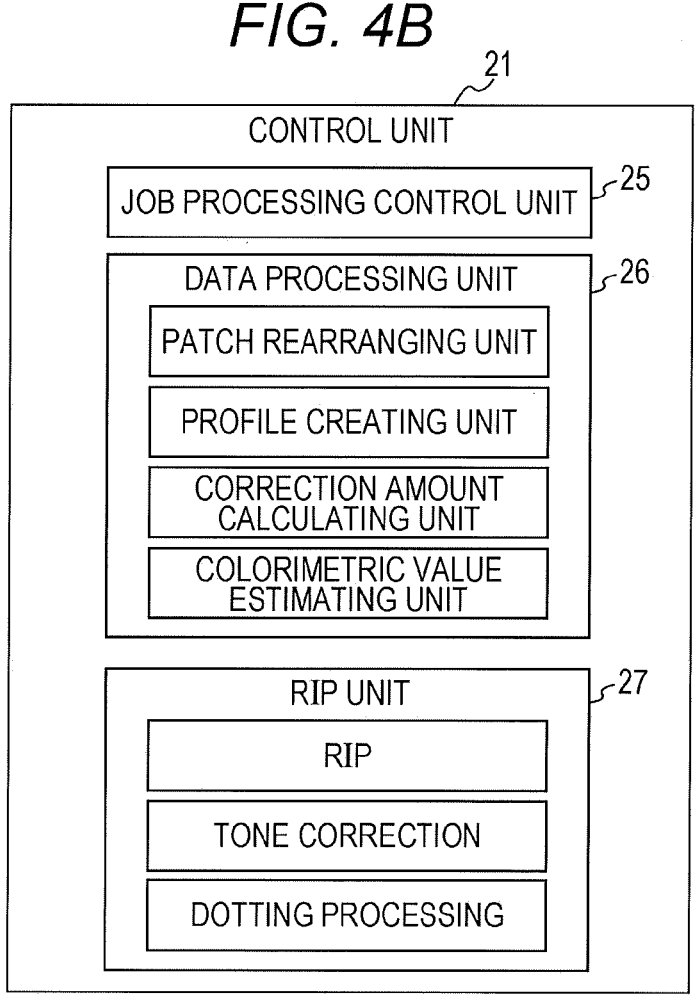
Figure 5:
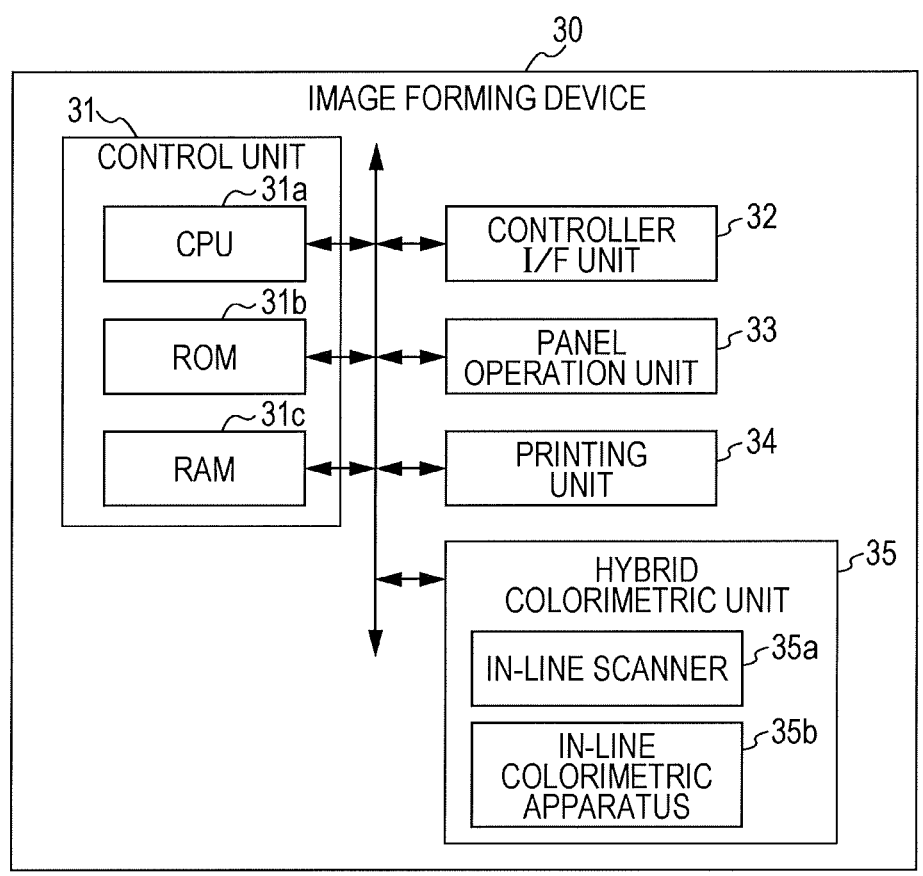
FIG. 5 is a block diagram illustrating a structure of an image forming device according to the Example of the present invention.
Figure 6:
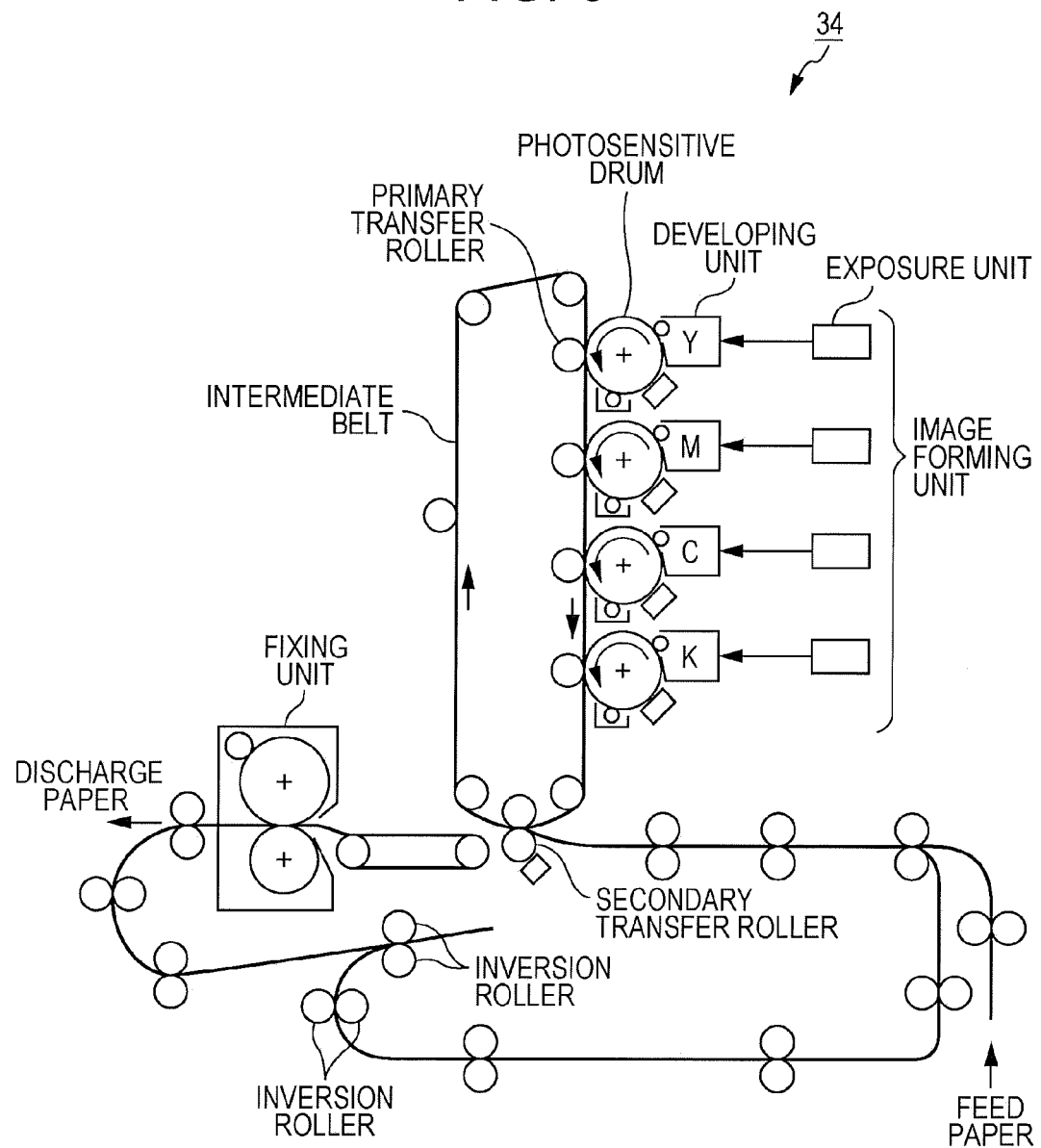
FIG. 6 is a schematic diagram illustrating a structure of a printing unit of the image forming device according to the Example of the present invention.
Figure 7:
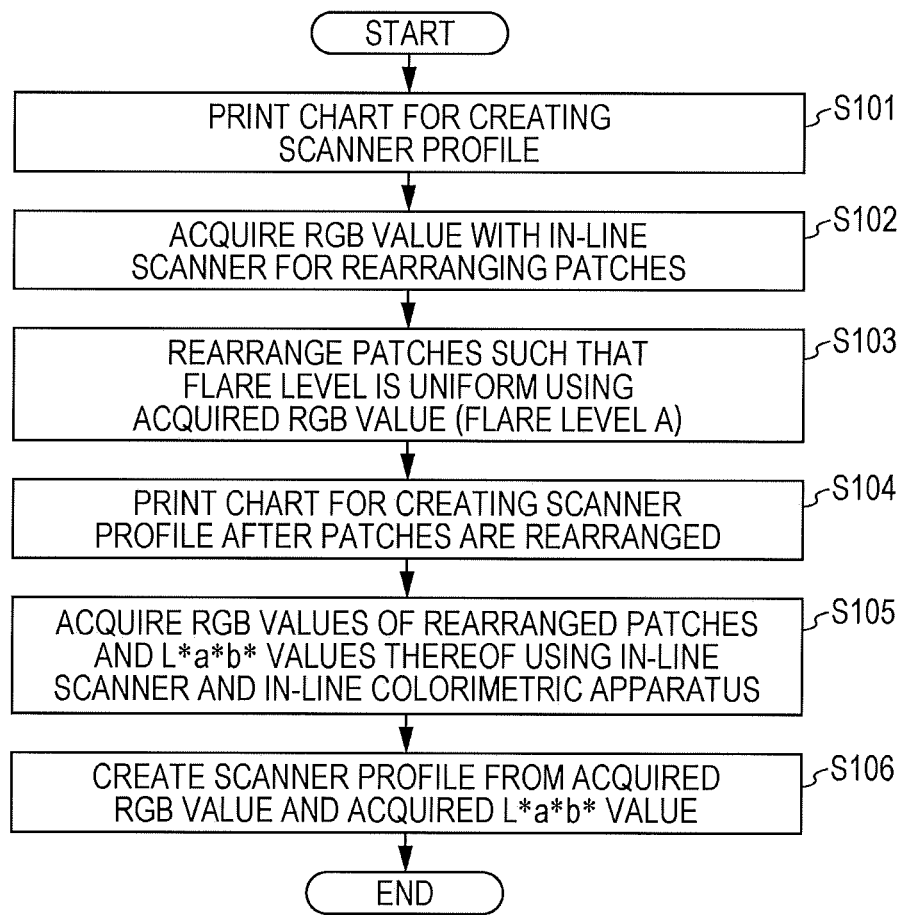
FIG. 7 is a flowchart illustrating an operation of a printing system (processing for creating a scanner profile) according to the Example of the present invention.
Figure 8:
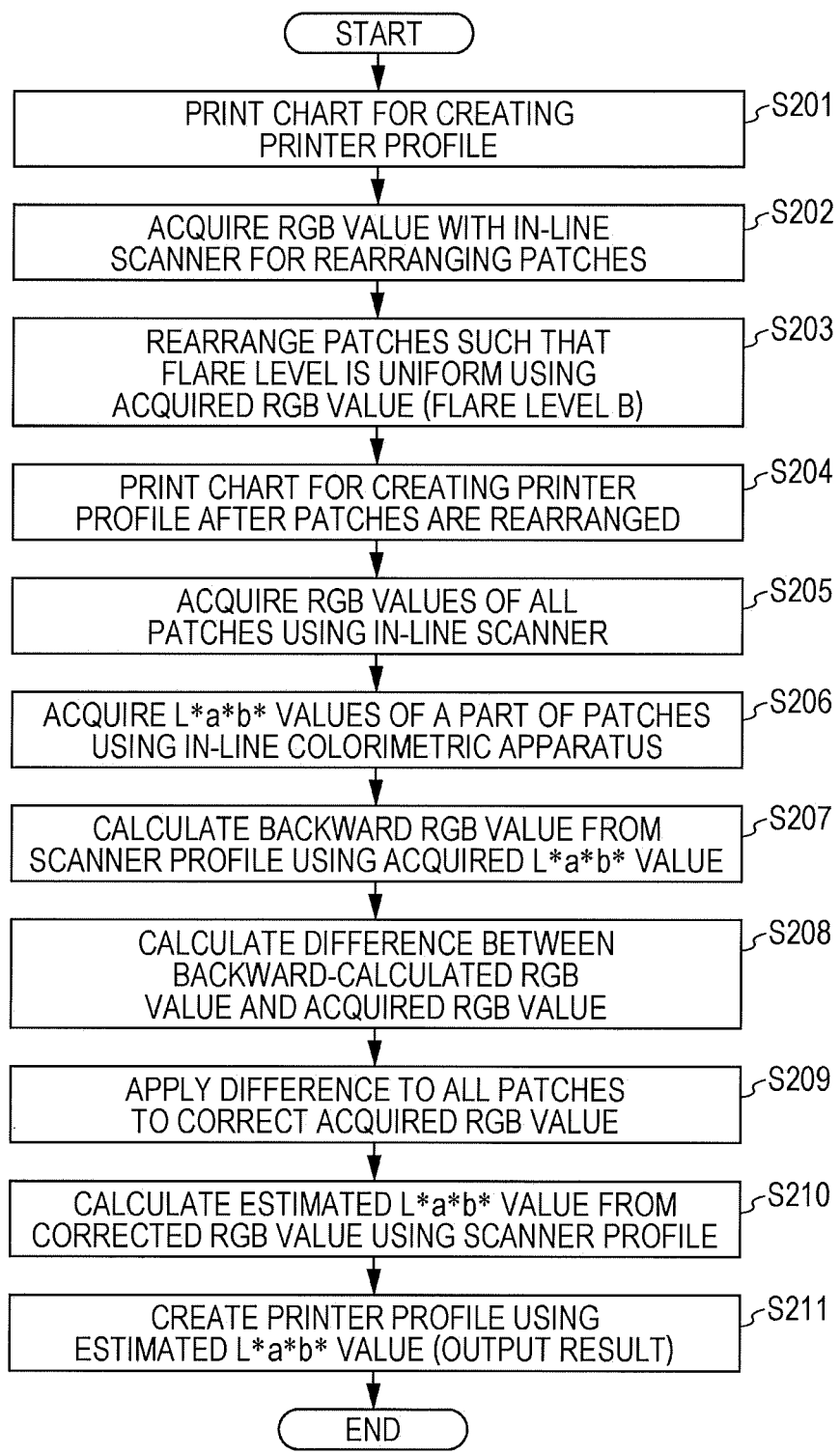
FIG. 8 is a flowchart illustrating an operation of a printing system (processing for creating a printer profile) according to the Example of the present invention.
Figure 9:
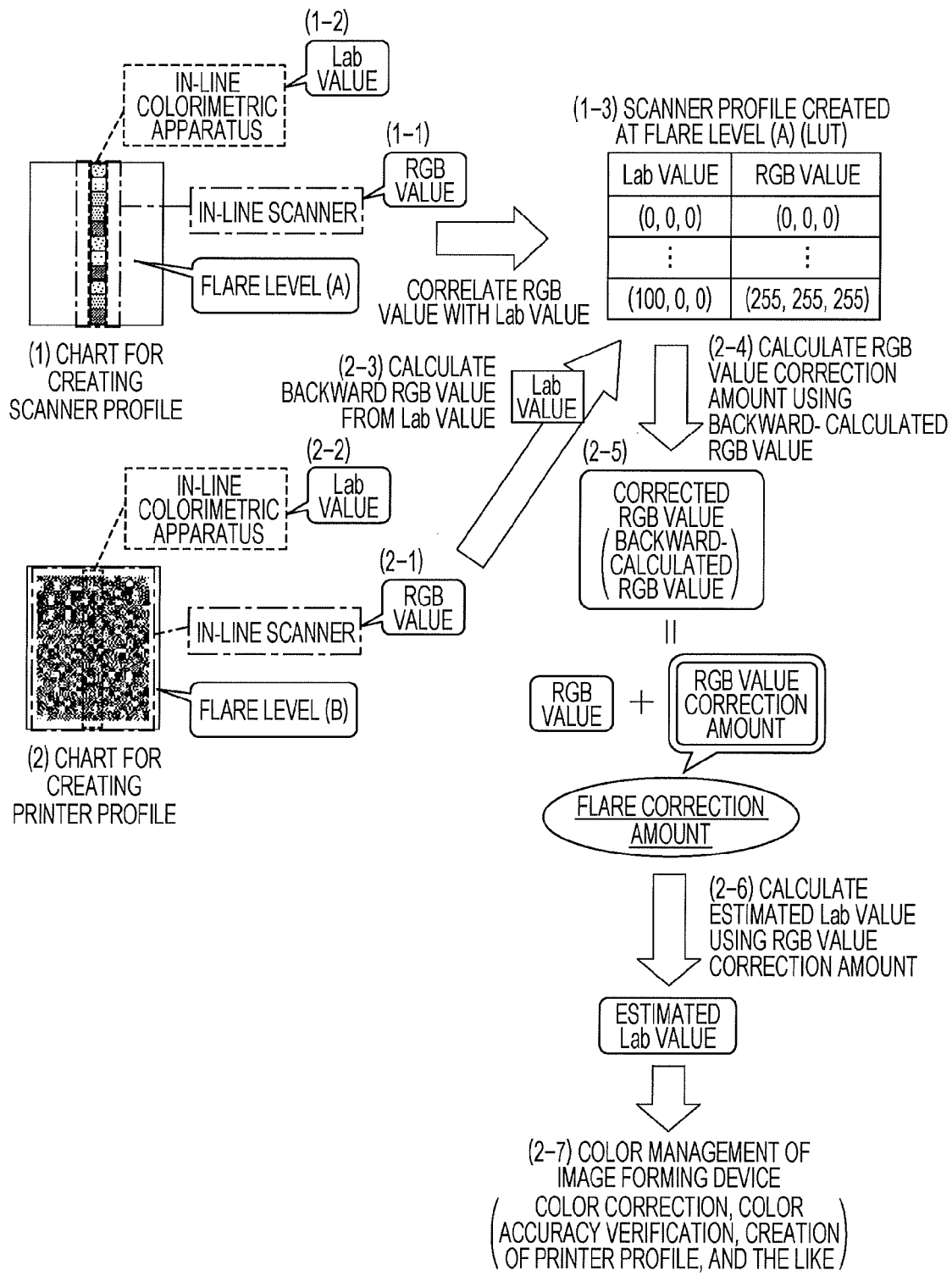
FIG. 9 is a schematic diagram illustrating a rough operation of a printing system according to the Example of the present invention.
Figure 10:
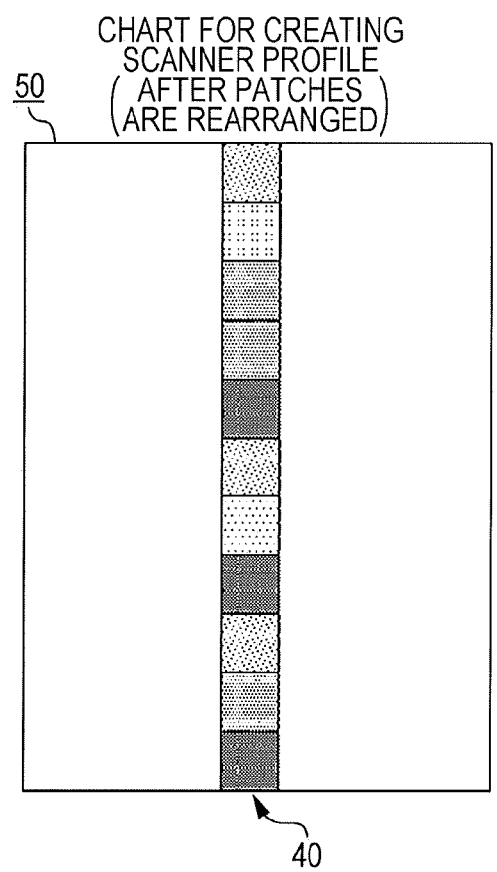
FIG. 10 exemplifies a chart for creating a scanner profile according to the Example of the present invention.
Figure 11A:
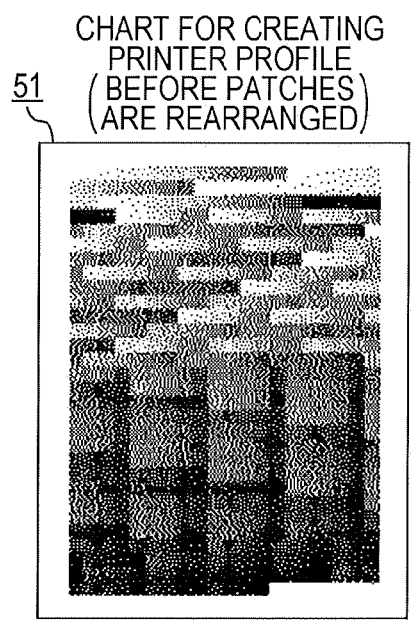
FIGS. 11A and 11B exemplify charts for creating a printer profile according to the Example of the present invention.
Figure 11B:
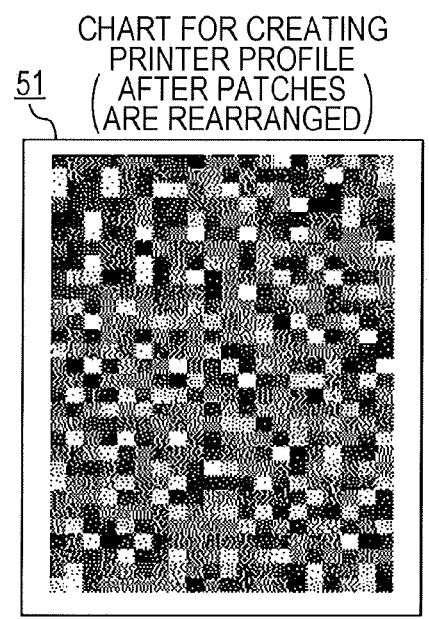
Figure 12:
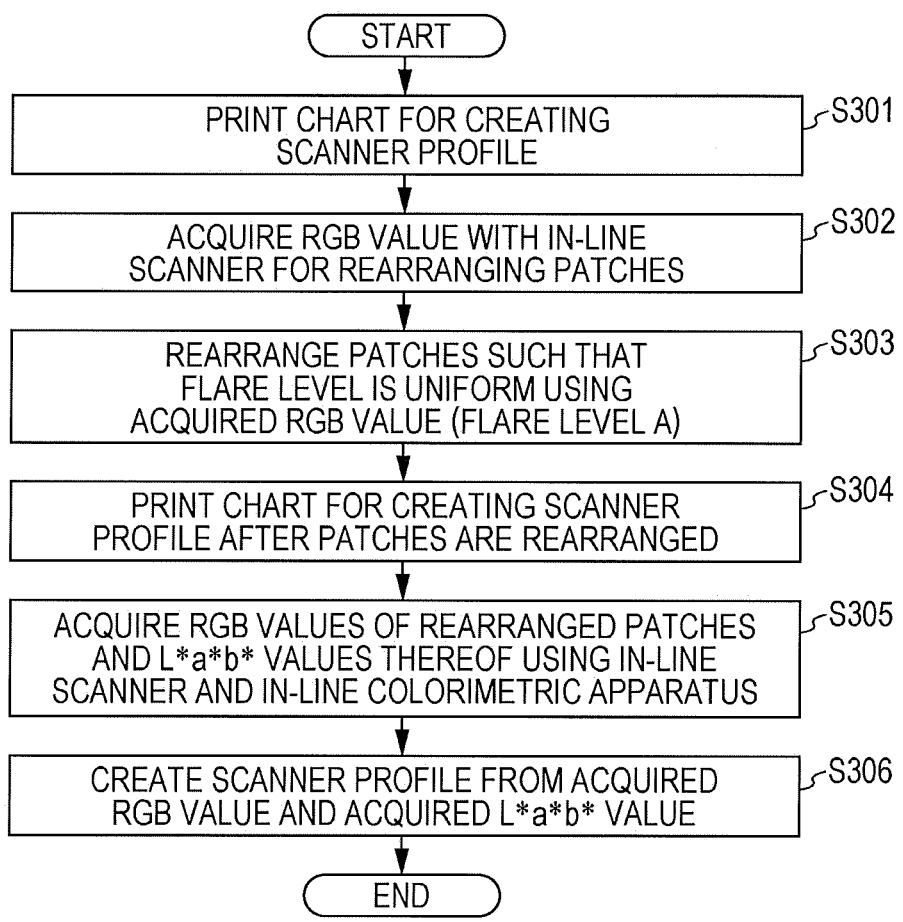
FIG. 12 is a flowchart illustrating an operation of a printing system (processing for creating a scanner profile) in a case where a profile is created by applying a technology of an earlier application.
Figure 13:
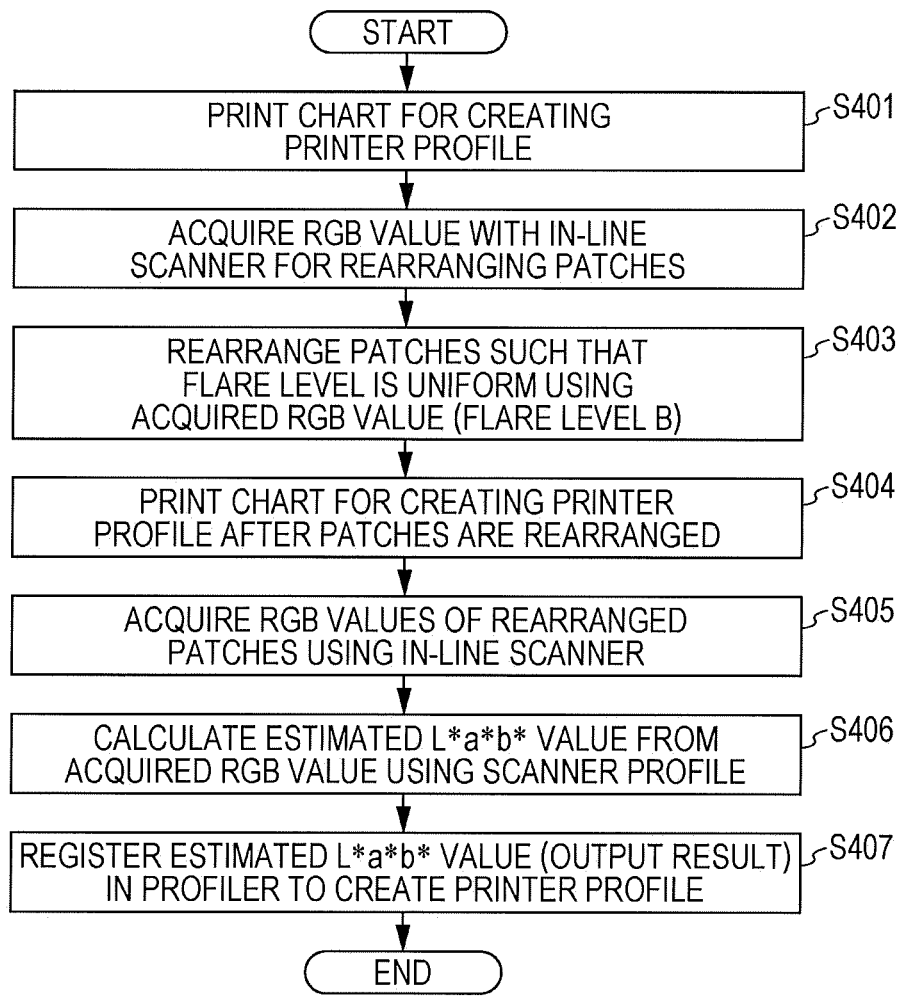
FIG. 13 is a flowchart illustrating an operation of a printing system (processing for creating a printer profile) in a case where a profile is created by applying a technology of an earlier application.
Figure 14:
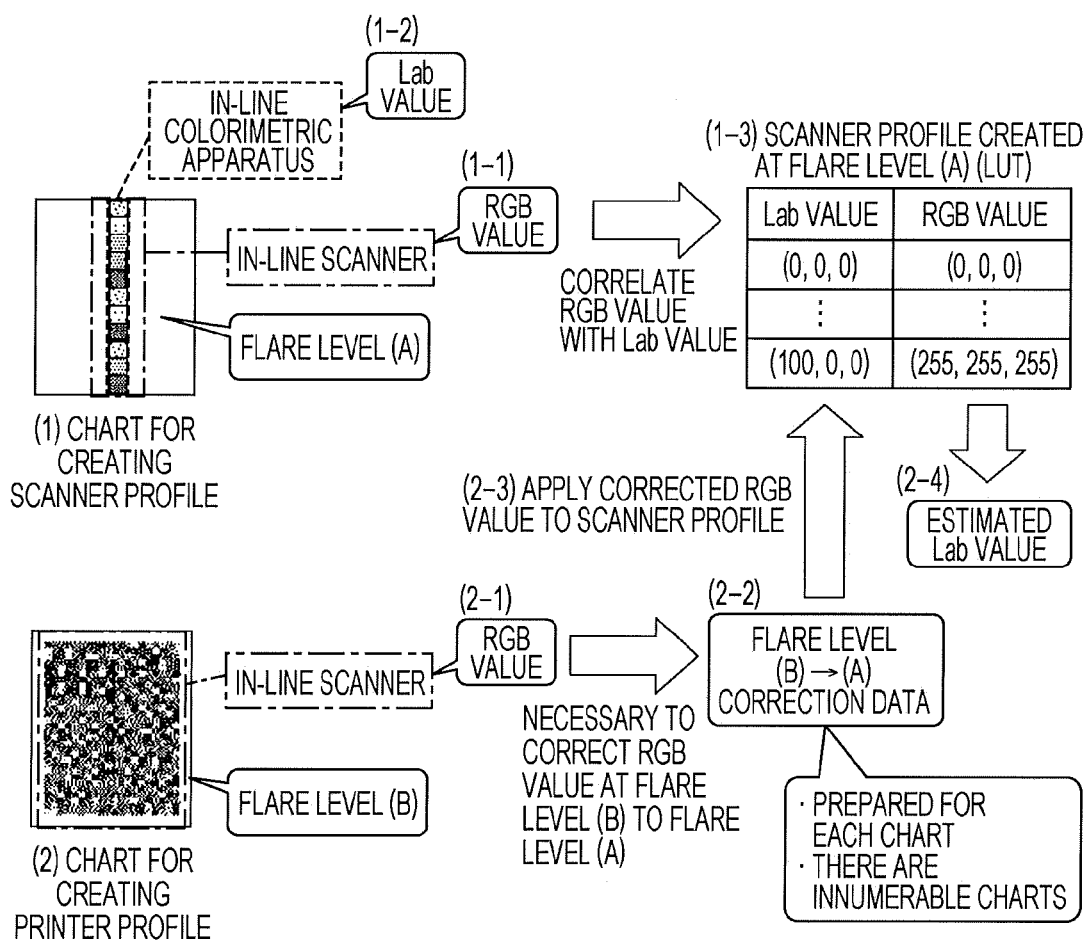
FIG. 14 is a schematic diagram illustrating a rough operation of a printing system in a case where a profile is created by applying a technology of an earlier application.

In order to describe the above embodiment of the present invention in more detail, a colorimetric value acquisition method, an image forming device, and a colorimetric value acquisition control program according to an Example of the present invention will be described with reference to FIGS. 1 to 14. FIGS. 1 and 2 are schematic diagrams illustrating structures of a printing system according to the present Example. FIGS. 3A and 3B are block diagrams illustrating a structure of a client device. FIGS. 4A and 4B are block diagrams illustrating a structure of a printer controller. FIG. 5 is a block diagram illustrating a structure of the image forming device. FIG. 6 is a schematic diagram illustrating a structure of a printing unit of the image forming device. FIGS. 7 and 8 are flowcharts illustrating an operation of a printing system according to the present Example. FIG. 9 is a schematic diagram illustrating a rough operation of the printing system according to the present Example. FIG. 10 exemplifies a chart for creating a scanner profile according to the present Example. FIGS. 11A and 11B exemplify charts for creating a printer profile according to the present Example. FIGS. 12 and 13 are flowcharts illustrating operations of a printing system in a case where a profile is created by applying a technology of an earlier application. FIG. 14 is a schematic diagram illustrating a rough operation thereof.

As described above, the flare means a phenomenon that reflected light more than an original output is measured due to irregular reflection between a measurement object and a light source. The flare level means the degree (amount) of an influence on a patch by surrounding reflected light. Change of the kind of a chart (patch structure) changes the flare level. A colorimetric value (an L*a*b* value or an XYZ value) acquired with a colorimetric apparatus is not influenced by the flare. An RGB value acquired with a scanner is influenced by the flare. Therefore, even when patches have the same colorimetric value acquired, the patches having different flare levels caused by the surroundings make a difference in an RGB value. Therefore, in the present Example, a flare level in each of the charts is made to be uniform by rearranging patches of each of a chart for creating a scanner profile and a chart utilizing a scanner profile (a chart for creating a printer profile in the present Example) using a method described in an earlier application by the present inventors (Japanese Patent Application No. 2015-041076). In the present Example, a case where a printer profile is created using an estimated colorimetric value will be described. However, an embodiment of the present invention can be applied similarly also to a case where color management such as color correction or color accuracy verification is performed using an estimated colorimetric value.

As illustrated in FIG. 1, in the printing system according to the present Example, a client device 10, a printer controller 20, and an image forming device 30 capable of being connected to one another by a communication network are disposed on an intranet. As a standard of the communication network, Ethernet (registered trademark) or the like can be used. However, data transfer from the printer controller 20 to the image forming device 30 can be performed using IEEE1394, Parallel, or the like in addition to Ethernet (registered trademark). In FIG. 1, the printer controller 20 is disposed separately from the image forming device 30. However, as illustrated in FIG. 2, the image forming device 30 may include the printer controller 20. FIGS. 1 and 2 illustrate structures of the image forming device 30 including a scanner (in-line scanner) and a colorimetric apparatus (in-line colorimetric apparatus). However, an external scanner and/or colorimetric apparatus may be used. Hereinafter, the devices will be described in detail.

[Client Device]

The client device 10 is a computer device such as a personal computer. As illustrated in FIG. 3A, the client device 10 includes a control unit 11, a storage unit 12, a network I/F unit 13, a display unit 14, an operation unit 15, and the like.

The control unit 11 includes a central processing unit (CPU) 11a and a memory such as a read only memory (ROM) 11b or a random access memory (RAM) 11c, connected to one another via a bus. The CPU 11a reads a program from the ROM 11b or the storage unit 12, and develops the program in the RAM 11c to execute the program. The CPU 11a thereby controls the entire client device 10.

As illustrated in FIG. 3B, the control unit 11 also acts as an operating system (OS) 16 such as Windows (registered trademark) or Macintosh (registered trademark), a document creation application 17 for creating a document on the OS 16, a printer driver 18 for converting document data created with the document creation application 17 into a language capable of being understood by the printer controller 20 (page description language (PDL) such as printer control language (PCL) or post script (PS)) and creating a printing job by specifying a printing condition or a post-processing condition, or the like.

The storage unit 12 includes a hard disk drive (HDD), a solid state drive (SSD), and the like, and stores a program, document data, a printing job, and the like used for control of the units by the CPU 11a.

The network I/F unit 13 includes a network interface card (NIC), a modem, and the like, establishes connection to the printer controller 20 connected via the network, and sends a printing job or the like.

The display unit 14 includes a liquid crystal display (LCD) and the like, and displays a screen for creating a document, a screen for setting a document printing condition (the number of printing copies, the kind of paper, one side/both sides, color/monochrome, or the like) or a post-processing condition (insertion of tab paper, stapling, punching, or the like), and the like. The operation unit 15 includes a keyboard, a mouse, a touch panel integrated with the display unit 14, and the like, and makes creation of a document and an operation such as setting of a printing condition or a post-processing condition possible.

[Printer Controller]

The printer controller 20 is a control device such as a computer device. The printer controller 20 controls the image forming device 30, and rearranges patches of a chart or creates a profile. As illustrated in FIG. 4A, the printer controller 20 includes a control unit 21, a storage unit 22, a network I/F unit 23, a printer I/F unit 24, and the like.

The control unit 21 includes a CPU 21a and a memory such as a ROM 21b or a RAM 21c, connected to one another via a bus. The CPU 21a reads a program from the ROM 21b or the storage unit 22, and develops the program in the RAM 21c to execute the program. The CPU 21a thereby controls the entire printer controller 20.

As illustrated in FIG. 4B, the control unit 21 also acts as a job processing control unit 25, a data processing unit 26, a RIP unit 27, or the like.

The job processing control unit 25 analyzes a PDL command of a printing job received from the client device 10 to acquire a job setting such as the number of printing copies, the kind of paper, both sides/one side, color/monochrome, an object used in each page (image/graphic/text), or post-processing including insertion of tab paper, stapling, and punching. Then, the job processing control unit 25 causes the RIP unit 27 to generate a printing image, sends printing image data to the image forming device 30, and instructs printing. When receiving a color correction request from the image forming device 30, the job processing control unit 25 instructs the data processing unit 26 to create a chart.

The data processing unit 26 generates an image of a patch required for color correction according to the instruction to create a chart from the job processing control unit 25. Then, the data processing unit 26 transfers an image of each of patches and layout information of the patch to the RIP unit 27, causes the RIP unit 27 to generate a printing image of a chart, acquires colorimetric data (an RGB value of each of patches and an L*a*b* value thereof) of the chart from the image forming device 30, and stores the colorimetric data in the storage unit 22. Then, the data processing unit 26 performs color correction such as creation/update of a color conversion table (profile) based on this colorimetric data of the chart.

Specifically, the data processing unit 26 acts as a patch rearranging unit, a profile creating unit, a correction amount calculating unit, a colorimetric value estimating unit, or the like.

In order to make an influence by irregularly reflected light from surroundings of a patch to be measured uniform, by referring to the colorimetric data stored in the storage unit 22, the patch rearranging unit rearranges patches such that a value obtained by averaging RGB values of patches in a small patch group including the patch to be measured and patches in the vicinity thereof (an average RGB value) is uniform in a chart, transfers an image of each of patches and layout information of the rearranged patches to the RIP unit 27, and causes the RIP unit 27 to generate a printing image of the chart. An earlier application by the present inventors (Japanese Patent Application No. 2015-041076) describes rearrangement of patches in detail.

When acquiring RGB values and L*a*b* values of all the patches of the chart for creating a scanner profile after the patches are rearranged from the image forming device 30, the profile creating unit creates a scanner profile by correlating each of the RGB values with each of the L*a*b* values. The profile creating unit creates a printer profile using an estimated L*a*b* value calculated by the colorimetric value estimating unit.

When acquiring RGB values of all the patches of the chart for creating a printer profile after the patches are rearranged and L*a*b* values of a part of the patches (for example, one patch at a specific position of a chart) from the image forming device 30, the correction amount calculating unit calculates backward (specifies) an RGB value corresponding to each of the acquired L*a*b* values using a scanner profile, and calculates a difference between the specified RGB value and the acquired RGB value (referred to as an RGB value correction amount).

The colorimetric value estimating unit calculates an RGB value (referred to as a corrected RGB value) by applying the difference (RGB value correction amount) to the RGB values of all the patches of the chart for creating a printer profile, and acquires an L*a*b* value (referred to as an estimated L*a*b* value) corresponding to the corrected RGB value using a scanner profile.

The RIP unit 27 translates PDL data to create intermediate data, performs color conversion to the intermediate data using a color conversion table, and generates a printing image (referred to as a page image) of each page of a document by rendering (this series of processing is referred to as RIP processing). The RIP unit 27 generates a printing image of a chart on which a patch image is disposed according to the patch image transferred from the data processing unit 26 and the layout information of the patch, and transfers the printing image to the job processing control unit 25. The RIP unit 27 performs screen processing, tone correction, concentration balance adjustment, thinning, dotting processing, or the like to the printing image, if necessary.

The job processing control unit 25, the data processing unit 26, and the RIP unit 27 may be configured as hardware, or the control unit 21 may be configured as the colorimetric value acquisition control program to act as the job processing control unit 25, the data processing unit 26, and the RIP unit 27 (particularly, the patch rearranging unit of the data processing unit 26, the profile creating unit thereof, the correction amount calculating unit thereof, and the colorimetric value estimating unit thereof) to cause the CPU 21a to execute the colorimetric value acquisition control program.

The storage unit 22 includes an HDD, an SSD, and the like, and stores a program necessary for the CPU 21a to control the units (including the colorimetric value acquisition control program), a printing job, printing image data, a color conversion table (profile), colorimetric data of a chart (an RGB value of each of patches and an L*a*b* value thereof), and the like.

The network I/F unit 23 includes an NIC, a modem, and the like, establishes connection to the client device 10 connected via the network, and receives a printing job or the like. The printer I/F unit 24 is a dedicated interface for connection to the image forming device 30. The printer I/F unit 24 sends printing image data or instruction information (printing instruction information or colorimetry instruction information) to the image forming device 30 or receives a color correction request or colorimetric data of a chart from the image forming device 30.

[Image Forming Device]

The image forming device 30 is one of multi-functional peripherals (MFP) to execute printing according to instruction by the printer controller 20 or the like. As illustrated in FIG. 5, the image forming device 30 includes a control unit 31, a controller I/F unit 32, a panel operation unit 33, a printing unit 34, a hybrid colorimetric unit 35, and the like.

The control unit 31 includes a CPU 31a and a memory such as a ROM 31b or a RAM 31c, connected to one another via a bus. The CPU 31a reads a program from the ROM 31b, and develops the program in the RAM 31c to execute the program. The CPU 31a thereby controls the entire image forming device 30. The control unit 31 counts the number of color printing copies, use time of a device, or the like. When the counted value reaches a value determined in advance, the control unit 31 determines that color correction is necessary, and sends a color correction request to the printer controller 20.

The printer I/F unit 32 is a dedicated interface for connection to the printer controller 20. The printer I/F unit 32 receives printing image data or instruction information (printing instruction information or colorimetry instruction information) from the printer controller 20, sends a color correction request to the printer controller 20, or sends an RGB value or an L*a*b* value measured by the hybrid colorimetric unit 35 thereto.

The panel operation unit 33 is a touch panel in which a touch sensor formed of a latticed transparent electrode is formed on a display unit such as an LCD. The panel operation unit 33 displays various screens, and makes various operations on the screens possible.

The printing unit 34 is an engine for executing printing processing based on a printing image. Specifically, as illustrated in FIG. 6, the printing unit 34 includes an image forming unit for forming toner images of CMYK colors, provided with an exposure unit for exposing by irradiation with laser light based on a printing image, a photosensitive drum, a developing device, a charging device, a photosensitive cleaning unit, and a primary transfer roller, an intermediate belt rotated by a roller and acting as an intermediate transfer body for transferring the toner image formed in the image forming unit to a sheet, a secondary transfer roller for transferring the toner image formed on the intermediate belt to the sheet, a fixing unit for fixing the toner image transferred to the sheet, a conveying unit such as a paper feed roller for conveying a sheet, a resist roller, a loop roller, an inversion roller, or a paper discharge roller, and the like.

The hybrid colorimetric unit 35 includes an in-line scanner 35a and an in-line colorimetric apparatus 35b, disposed on a conveying path of a sheet between the fixing unit and a paper discharge tray or the like. For example, the in-line scanner 35a includes three kinds of sensors of RGB, and measures reflected light of each of patches of a chart formed on a sheet by the printing unit 34 to output an RGB value. The in-line colorimetric apparatus 35b is a spectrum system (spectrophotometer) colorimetric apparatus capable of measuring light for each wavelength. The in-line colorimetric apparatus 35b measures an absorption spectrum of each of patches of a chart formed on a sheet by the printing unit 34 to output a colorimetric value (an L*a*b* value or an XYZ value, but an L*a*b* value is used in the present Example).

FIGS. 1 to 6 exemplify a printing system according to the present Example. A long as an RGB value and an L*a*b* value can be acquired by measuring a chart and color management such as creation/update of a profile, color correction, or color accuracy verification can be performed, a structure of each of the units and control thereof can be changed appropriately.

For example, in the above description, the control unit 21 in the printer controller 20 acts as the data processing unit 26 and the RIP unit 27. However, as illustrated in FIG. 2, when the image forming device 30 includes the printer controller 20, the control unit 31 in the image forming device 30 may act as the data processing unit 26 and the RIP unit 27 (alternatively, the CPU 31a may execute the colorimetric value acquisition control program).

Next, a normal printing operation in the printing system having the above structure will be outlined.

First, a document for printing is created with the document creation application 17 (for example, Word (registered trademark) or Excel (registered trademark) manufactured by Microsoft Corporation (registered trademark)) installed in the client device 10 in advance. Data in an application file format formed with the document creation application 17 is converted into PDL data in a PDL file format by the printer driver 18, and is sent to the printer controller 20 via an intranet.

The PDL data is disposed in the printer controller 20 in the order of arrival. The job processing control unit 25 analyzes setting of a job, and the RIP unit 27 converts the PDL data into a printing image. Then, the printing image data and instruction information based on the job setting are sent to the image forming device 30. The image forming device 30 executes printing processing according to the printing image data and the instruction information. The printing image data stored in the printer controller 20 can be printed using an application for job management.

Hereinafter, a colorimetric value acquisition method according to the present Example will be described. However, before the description, a conventional method for creating a scanner profile and a printer profile using a chart in which patches have been rearranged by applying a technology of an earlier application by the present inventors will be described with reference to the flowcharts in FIGS. 12 and 13 and the schematic diagram in FIG. 14.

[Processing for Creating Scanner Profile]

As illustrated in FIG. 12, an image forming device prints a chart for creating a scanner profile according to a printing instruction by a printer controller (S301), and acquires an RGB value of each of patches of the chart for creating a scanner profile using an in-line scanner for rearrangement of the patches (S302).

Subsequently, the image forming device (or a printer controller) rearranges the patches using the acquired RGB values such that a flare level is uniform (S303). Specifically, as described in the earlier application by the present inventors, for two patches selected from a plurality of patches included in a chart, when a patch selected from one patch and patches in the vicinity thereof is exchanged with the other patch, the image forming device calculates an average RGB value of a small patch group including the exchanged patches, specifies a combination of patches having the smallest standard deviation of the average RGB value, exchanges the patches according to the specified combination, and repeats this exchange of patches.

Subsequently, the image forming device prints the chart for creating a scanner profile in which the patches have been rearranged (S304). FIG. 14 (1) exemplifies a chart for creating a scanner profile in which patches have been rearranged (flare level (A)). Then, the image forming device acquires an RGB value of each of patches of the chart for creating a scanner profile (refer to FIG. 14 (1-1)) using an in-line scanner, and acquires an L*a*b* value of each of patches of the chart for creating a scanner profile (refer to FIG. 14 (1-2), in the figure, abbreviated as an Lab value) using an in-line colorimetric apparatus (S305). Then, the image forming device correlates the RGB value of each of patches with the L*a*b* value thereof to create a scanner profile illustrated in FIG. 14 (1-3) (S306).

[Processing for Creating Printer Profile]

As illustrated in FIG. 13, an image forming device prints a chart for creating a printer profile according to a printing instruction by a printer controller (S401), and acquires an RGB value of each of patches of the chart for creating a printer profile using an in-line scanner for rearrangement of the patches (S402). Subsequently, the image forming device (or a printer controller) rearranges the patches using the RGB values of patches such that a flare level is uniform according to the above-described method (S403).

Subsequently, the image forming device prints the chart for creating a printer profile in which the patches have been rearranged (S404). FIG. 14 (2) exemplifies a chart for creating a printer profile in which patches have been rearranged (flare level (B)). Subsequently, the image forming device acquires an RGB value of each of patches of the chart for creating a scanner profile (refer to FIG. 14 (2-1)) using an in-line scanner (S405).

At this time, the acquired RGB value is an RGB value at the flare level (B). Therefore, it is necessary to correct the RGB value to an RGB value at the flare level (A). Therefore, the image forming device corrects the RGB value at the flare level (B) to the RGB value at the flare level (A) using correction data for correcting the flare level (B) to the flare level (A) (refer to FIG. 14 (2-2)). Thereafter, the image forming device calculates an estimated L*a*b* value (S406, refer to FIG. 14 (2-4)) by applying the corrected RGB value to a scanner profile (refer to FIG. 14 (2-3)). Thereafter, the image forming device registers the estimated L*a*b* value in a profiler, and the profiler creates a printer profile using the estimated L*a*b* value (S407).

Here, when there is correction data for correcting the flare level (B) to the flare level (A), the RGB value obtained by measuring the chart at the flare level (B) can be corrected to the RGB value at the flare level (A), and therefore an L*a*b* value can be estimated. However, this correction data is required for each chart, and there are innumerable charts. Therefore, it is unrealistic to calculate this correction data in advance. On the other hand, it is also possible to acquire an L*a*b* value not influenced by a flare level by measuring patches of the chart for creating a printer profile with an in-line colorimetric apparatus. However, colorimetry with the in-line colorimetric apparatus takes time, and many charts for creating a printer profile have to be output in order to measure the patches with the in-line colorimetric apparatus. Therefore, waste paper is increased.

Therefore, in the present Example, colorimetric values of all the patches of the chart for creating a printer profile can be acquired simply without using correction data not by measuring all the patches with an in-line colorimetric apparatus but by measuring a part of the patches (one patch at a specific position of the chart) and applying a correction amount calculated from the colorimetric value to all the patches.

Hereinafter, an operation of a printing system according to the present Example will be described with reference to FIGS. 7 to 11B. The CPU 21a develops the colorimetric value acquisition control program stored in the ROM 21b or the storage unit 22 in the RAM 21c to execute the program, and thereby executes processing in steps illustrated in the flowcharts of FIGS. 7 and 8.

[Processing for Creating Scanner Profile]

As illustrated in FIG. 7, the control unit 21 (job processing control unit 25) in the printer controller 20 sends an instruction to print a chart for creating a scanner profile to the image forming device 30. The image forming device 30 prints the chart for creating a scanner profile according to the printing instruction by the printer controller 20 (S101), and acquires an RGB value of each of patches of the chart for creating a scanner profile using the in-line scanner 35a for rearrangement of the patches (S102). Subsequently, the control unit 21 (patch rearranging unit of the data processing unit 26) in the printer controller 20 acquires an RGB value of each of patches of the chart for creating a scanner profile from the image forming device 30, and rearranges the patches using the RGB value such that a flare level is uniform according to the above-described method (S103). The control unit 21 (job processing control unit 25) in the printer controller 20 sends an instruction to print the chart for creating a scanner profile in which the patches have been rearranged to the image forming device 30.

The image forming device 30 prints the chart for creating a scanner profile in which the patches have been rearranged according to the printing instruction by the printer controller 20 (S104). FIGS. 9 (1) and 10 each exemplify a chart for creating a scanner profile in which patches have been rearranged (flare level (A)). In a chart for creating a scanner profile 50, patches 40 are disposed only in a line (not limited to one line) determined in advance.

The image forming device 30 acquires an RGB value of each of patches of the chart for creating a scanner profile (refer to FIG. 9 (1-1)) using the in-line scanner 35a, and acquires an L*a*b* value of each of patches of the chart for creating a scanner profile (refer to FIG. 9 (1-2)) using the in-line colorimetric apparatus 35b (S105). Then, the control unit 21 (profile creating unit of the data processing unit 26) in the printer controller 20 acquires an RGB value of each of patches of the chart for creating a scanner profile and an L*a*b* value thereof from the image forming device 30, and correlates the RGB value to the L*a*b* value to create a scanner profile illustrated in FIG. 9 (1-3) (S106). Processing for creating a scanner profile is similar to the above-described conventional method.

[Processing for Creating Printer Profile]

The control unit 21 (job processing control unit 25) in the printer controller 20 sends an instruction to print a chart for creating a scanner profile to the image forming device 30. The image forming device 30 prints the chart for creating a printer profile according to the printing instruction by the printer controller 20 (S201), and acquires an RGB value of each of patches of the chart for creating a printer profile using the in-line scanner 35a for rearrangement of the patches (S202). Subsequently, the control unit 21 (patch rearranging unit of the data processing unit 26) in the printer controller 20 acquires an RGB value of each of patches of the chart for creating a printer profile from the image forming device 30, and rearranges the patches using the RGB value such that a flare level is uniform according to the above-described method (S203). The control unit 21 (job processing control unit 25) in the printer controller 20 sends an instruction to print the chart for creating a printer profile in which the patches have been rearranged to the image forming device 30.

Subsequently, the image forming device 30 prints the chart for creating a printer profile in which the patches have been rearranged according to the printing instruction by the printer controller 20 (S204). FIG. 11A exemplifies a chart for creating a printer profile before the patches are rearranged. FIGS. 9 (2) and 11B exemplify charts for creating a printer profile after the patches are rearranged (flare level (B)). The image forming device 30 acquires an RGB value of each of patches of the chart for creating a printer profile (refer to FIG. 9 (2-1)) using the in-line scanner 35a (S205), and further acquires an L*a*b* value of a part of the patches (one patch at a specific position of the chart) of the chart for creating a printer profile (refer to FIG. 9 (2-2)) using the in-line colorimetric apparatus 35b (S206).

Subsequently, the control unit 21 (correction amount calculating unit of the data processing unit 26) in the printer controller 20 acquires RGB values of all the patches of the chart for creating a printer profile and L*a*b* values of a part of the patches from the image forming device 30, and calculates backward (specifies) an RGB value corresponding to each of the acquired L*a*b* values using the scanner profile created according to the flowchart in FIG. 7 (S207, refer to FIG. 9 (2-3)). This backward-calculated RGB value becomes an RGB value at the flare level (A). Then, the control unit 21 (correction amount calculating unit of the data processing unit 26) in the printer controller 20 calculates a difference between the backward-calculated RGB value and the acquired RGB value (RGB value correction amount) (S208). When L*a*b* values of a plurality of patches are acquired, the difference is calculated for an RGB value corresponding to each of the L*a*b* values, and it is only necessary to perform the following processing using an average value of the differences, a representative value thereof, or the like.

Subsequently, the control unit 21 (colorimetric value estimating unit of the data processing unit 26) in the printer controller 20 corrects the acquired RGB value by applying the calculated difference (RGB value correction amount) to RGB values of all the patches of the chart for creating a printer profile (S209). That is, the difference between the backward-calculated RGB value and an RGB value corresponding to the acquired L*a*b* value is a correction amount from the flare level (B) to (A). This correction amount is applied to all the acquired RGB values (refer to FIG. 9 (2-5)). Then, the control unit 21 (colorimetric value estimating unit of the data processing unit 26) in the printer controller 20 calculates an estimated L*a*b* value by applying the corrected RGB value to which the RGB value correction amount has been added to the scanner profile (S210, refer to FIG. 9 (2-6)).

Thereafter, the control unit 21 (profile creating unit of the data processing unit 26) in the printer controller 20 creates a printer profile using the estimated L*a*b* value (S210, refer to FIG. 9 (2-7)), and stores the created printer profile in the storage unit 22 or the like.

As described above, when a chart utilizing a scanner profile (chart for creating a printer profile in which patches have been rearranged such that a flare level is uniform, or the like) is subjected to colorimetry after the scanner profile is created by measuring a chart for creating a scanner profile in which patches have been rearranged such that a flare level is uniform with the in-line scanner 35a and the in-line colorimetric apparatus 35b, RGB values of all the patches are acquired using the in-line scanner 35a, L*a*b* values of a part of the patches are acquired using the in-line colorimetric apparatus 35b, an RGB value corresponding to each of the L*a*b* values is backward calculated (specified) using a scanner profile, a difference between the backward-calculated RGB value and the acquired RGB value (RGB value correction amount) is calculated, and the RGB value correction amount is applied to RGB values of all the patches of the chart for creating a printer profile. It is thereby possible to reduce the patches measured with the in-line colorimetric apparatus 35b as much as possible and to match a flare level of the chart for creating a scanner profile with that of the chart for creating a printer profile. By using the hybrid colorimetric unit 35, a flare level can be corrected dynamically, and color matching can be performed at a high accuracy.

An embodiment of the present invention is not limited to the above Examples, but a structure of the printing system or each of the units and control thereof can be changed appropriately within a range not departing from a gist of an embodiment of the present invention.

For example, in the above Examples, a chart for creating a printer profile has been exemplified as a chart utilizing a scanner profile. However, the colorimetric value acquisition method according to an embodiment of the present invention can be similarly applied to any chart estimating an L*a*b* value from an RGB value by utilizing a scanner profile. In the above Examples, a case where a printer profile is created using an estimated L*a*b* value has been described. However, the colorimetric value acquisition method according to an embodiment of the present invention can be similarly applied to a case where any color management such as color correction or color accuracy verification is performed using an estimated L*a*b* value.

In the above Examples, a case where an L*a*b* value is acquired as a colorimetric value using the in-line colorimetric apparatus 35b has been exemplified. However, the colorimetric value acquisition method according to an embodiment of the present invention can be similarly applied to a case where an XYZ value is acquired as a colorimetric value.

In the above Examples, the hybrid colorimetric unit 35 is disposed on a conveying path of a sheet between a fixing unit and a paper discharge tray in the printing unit 34. However, the in-line scanner 35a and/or in-line colorimetric apparatus 35b included in the hybrid colorimetric unit 35 can be disposed near an intermediate belt. In this case, each of patches of a chart in which an image is formed on the intermediate belt is only required to be subjected to colorimetry. A scanner and/or colorimetric apparatus disposed outside the image forming device 30 can be used in place of the in-line scanner 35a and/or in-line colorimetric apparatus 35b.

The present invention can be used for a colorimetric value acquisition method for acquiring a colorimetric value to correct a flare level of a chart simply and properly, an image forming device, a colorimetric value acquisition control program, and a recording medium which has recorded the colorimetric value acquisition control program.

According to an embodiment of the present invention, the colorimetric value acquisition method, the image forming device, and the colorimetric value acquisition control program according to an embodiment of the present invention make it possible to acquire a colorimetric value to correct a flare level of a chart simply and properly.

This is because an image forming device (or a control device for controlling an image forming device) including a printing unit, an in-line scanner, and an in-line colorimetric apparatus performs such a control as follows. That is, the image forming device measures all patches of a first chart in which the patches are rearranged in advance such that a flare level is uniform with an in-line scanner to acquire RGB values. The image forming device measures all the patches with an in-line colorimetric apparatus to acquire colorimetric values (L*a*b* values or XYZ values), and creates a scanner profile by correlating each of the acquired RGB values with each of the colorimetric values. Thereafter, the image forming device measures all patches of a second chart in which the patches are rearranged in advance such that a flare level is uniform with an in-line scanner to acquire RGB values. The image forming device measures a part of the patches with the in-line colorimetric apparatus to acquire colorimetric values, specifies an RGB value corresponding to each of the acquired colorimetric values using the scanner profile, calculates a difference between the specified RGB value and the acquired RGB value, calculates a corrected RGB value by applying the difference to an RGB value of each of the patches of the second chart, acquires an estimated colorimetric value corresponding to the corrected RGB value using the scanner profile, and outputs the estimated colorimetric value.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A colorimetric value acquisition method in a system including a printing unit, a scanner configured to acquire an RGB value by measuring an image formed by the printing unit, and a colorimetric unit configured to acquire a colorimetric value formed of an L*a*b* value or an XYZ value by measuring an image formed by the printing unit, wherein the system executes:

first processing configured to cause the printing unit to print a first chart in which patches are rearranged in advance such that a flare level is uniform, to cause the scanner to measure all the patches of the first chart to acquire RGB values, to cause the colorimetric unit to measure all the patches to acquire colorimetric values, and to create a scanner profile by correlating the RGB values with the colorimetric values;

second processing configured to cause the printing unit to print a second chart in which patches are rearranged in advance such that a flare level is uniform, to cause the scanner to measure all the patches of the second chart to acquire RGB values, and to cause the colorimetric unit to measure a part of the patches to acquire colorimetric values;

third processing configured to specify an RGB value corresponding to each of the colorimetric values acquired in the second processing using the scanner profile;

fourth processing configured to calculate a difference between the RGB value specified in the third processing and an RGB value of each of the part of the patches acquired in the second processing;

fifth processing configured to calculate a corrected RGB value by applying the difference to an RGB value of each of the patches acquired in the second processing; and sixth processing configured to acquire an estimated colorimetric value corresponding to the corrected RGB value using the scanner profile, and to output the estimated colorimetric value for color management of the system.

2. The colorimetric value acquisition method according to claim 1, wherein the system further executes seventh processing configured to create a printer profile using the estimated colorimetric value.

3. The colorimetric value acquisition method according to claim 1, wherein the part of the patches is one patch at a specific position of the second chart.

4. The colorimetric value acquisition method according to claim 1, wherein each of the first processing and the second processing includes processing configured to cause the scanner to measure all patches of a chart to acquire RGB values, and to make a flare level in the chart uniform by rearranging the patches such that a variation of an average RGB value obtained by averaging RGB values of patches in a small patch group including a patch to be measured and a patch near the patch in the chart is within a predetermined range.

5. An image forming device provided with a printing unit, an in-line scanner configured to acquire an RGB value by measuring an image formed by the printing unit, and an in-line colorimetric unit configured to acquire a colorimetric value formed of an L*a*b* value or an XYZ value by measuring an image formed by the printing unit, comprising:

a profile creating unit configured to cause the printing unit to print a first chart in which patches are rearranged in advance such that a flare level is uniform, to cause the in-line scanner to measure all the patches of the first chart to acquire RGB values, to cause the in-line colorimetric unit to measure all the patches to acquire colorimetric values, and to create a scanner profile by correlating the RGB values with the colorimetric values;

a correction amount calculating unit configured to cause the printing unit to print a second chart in which patches are rearranged in advance such that a flare level is uniform, to cause the in-line scanner to measure all the patches of the second chart to acquire RGB values, to cause the in-line colorimetric unit to measure a part of the patches to acquire colorimetric values, to specify an RGB value corresponding to each of the acquired colorimetric values using the scanner profile, and to calculate a difference between the RGB value specified using the scanner profile and an RGB value of each of the part of the patches acquired by measurement with the in-line scanner; and a colorimetric value estimating unit configured to calculate a corrected RGB value by applying the difference to an RGB value of each of the patches acquired by measurement with the in-line scanner, to acquire an estimated colorimetric value corresponding to the corrected RGB value using the scanner profile, and to output the estimated colorimetric value for color management of the image forming device.

6. The image forming device according to claim 5, wherein the profile creating unit creates a printer profile using the estimated colorimetric value.

7. The image forming device according to claim 5, wherein the part of the patches is one patch at a specific position of the second chart.

8. The image forming device according to claim 5, further comprising a patch rearranging unit configured to cause the in-line scanner to measure all patches of a chart to acquire RGB values, and to make a flare level in the chart uniform by rearranging the patches such that a variation of an average RGB value obtained by averaging RGB values of patches in a small patch group including a patch to be measured and a patch near the patch in the chart is within a predetermined range.

9. A non-transitory recording medium storing a computer readable program configured to control acquisition of a colorimetric value, operated by a system including an image forming device provided with a printing unit, an in-line scanner configured to acquire an RGB value by measuring an image formed by the printing unit, and an in-line colorimetric unit configured to acquire a colorimetric value formed of an L*a*b* value or an XYZ value by measuring an image formed by the printing unit, wherein the program causes a control device in the system to execute:

first processing configured to cause the printing unit to print a first chart in which patches are rearranged in advance such that a flare level is uniform, to cause the in-line scanner to measure all the patches of the first chart to acquire RGB values, to cause the in-line colorimetric unit to measure all the patches to acquire colorimetric values, and to create a scanner profile by correlating the RGB values with the colorimetric values;

second processing configured to cause the printing unit to print a second chart in which patches are rearranged in advance such that a flare level is uniform, to cause the in-line scanner to measure all the patches of the second chart to acquire RGB values, and to cause the in-line colorimetric unit to measure a part of the patches to acquire colorimetric values;

third processing configured to specify an RGB value corresponding to each of the colorimetric values acquired in the second processing using the scanner profile;

fourth processing configured to calculate a difference between the RGB value specified in the third processing and an RGB value of each of the part of the patches acquired in the second processing;

fifth processing configured to calculate a corrected RGB value by applying the difference to an RGB value of each of the patches acquired in the second processing; and sixth processing configured to acquire an estimated colorimetric value corresponding to the corrected RGB value using the scanner profile, and to output the estimated colorimetric value for color management of the image forming device.

10. The non-transitory recording medium storing a computer readable program configured to control acquisition of a colorimetric value according to claim 9, wherein the program further causes the control device to execute seventh processing configured to create a printer profile using the estimated colorimetric value.

11. The non-transitory recording medium storing a computer readable program configured to control acquisition of a colorimetric value according to claim 9, wherein the part of the patches is one patch at a specific position of the second chart.

12. The non-transitory recording medium storing a computer readable program configured to control acquisition of a colorimetric value according to claim 9, wherein each of the first processing and the second processing includes processing configured to cause the in-line scanner to measure all patches of a chart to acquire RGB values, and to make a flare level in the chart uniform by rearranging the patches such that a variation of an average RGB value obtained by averaging RGB values of patches in a small patch group including a patch to be measured and a patch near the patch in the chart is within a predetermined range.

* * * * *